United States Patent
Chang et al.

(10) Patent No.: US 8,082,942 B2
(45) Date of Patent: Dec. 27, 2011

(54) OIL PIPE CONNECTOR

(75) Inventors: Ching-Ching Chang, Taipei (TW); Ying-Ying Chang, Taipei (TW); Li-Jen Chang, Taipei (TW)

(73) Assignee: Bison Inc., Taipei (TW)

( * ) Notice: Subject to any disclaimer, the term of this patent is extended or adjusted under 35 U.S.C. 154(b) by 436 days.

(21) Appl. No.: 12/320,024

(22) Filed: Jan. 15, 2009

(65) Prior Publication Data

US 2010/0176586 A1    Jul. 15, 2010

(51) Int. Cl.
*F16K 1/12* (2006.01)
(52) U.S. Cl. .................................................. 137/219
(58) Field of Classification Search .............. 137/219, 137/220–222
See application file for complete search history.

(56) References Cited

U.S. PATENT DOCUMENTS

| | | | | |
|---|---|---|---|---|
| 4,693,268 A | * | 9/1987 | Fahl | 137/219 |
| 4,813,449 A | * | 3/1989 | Fahl | 137/219 |
| 5,005,602 A | * | 4/1991 | Fahl | 137/219 |
| 5,127,428 A | * | 7/1992 | Fahl | 137/219 |
| 5,622,201 A | * | 4/1997 | Chang | 137/219 |

* cited by examiner

*Primary Examiner* — Craig Schneider
(74) *Attorney, Agent, or Firm* — Muncy, Geissler, Olds & Lowe, PLLC

(57) ABSTRACT

The present invention discloses an oil pipe connector including a connector cylinder (abbr. cylinder), and having an oil inlet at front and an oil outlet at rear end of the cylinder; a switch base with a pivot hole interconnected with the interior of the cylinder; a control device, including a connector cap which being a hollow conical shape, the front end having positioning shaft hole interconnected with the interior; a control mechanism including a connecting portion, a positioning shaft and a piston disc coupled together; the positioning shaft being disposed in a positioning shaft hole of the connector cap; a switch device, including a push rod which being a curved lever, a transmission shaft and a switch handle; an end of the push rod linking the control mechanism; the transmission shaft being pivotally coupled to the pivot hole of the switch base of the cylinder; the switch handle being coupled to the connecting shaft lever.

9 Claims, 8 Drawing Sheets

OIL PIPE CONNECTOR

BACKGROUND OF THE INVENTION

1. Field of the Invention

The present invention relates to a connector technology, and more particularly to an oil pipe connector connected to an oil pipe of gas station for filling a large quantity of oil, making the oil pipeline smooth, and improving the oil filling efficiency.

2. Description of the Related Art

With reference to FIG. 1, a fuel oil storage tank is a standard equipment for present existing gas stations, and the fuel oil storage tank is used for storing fuel oil (such as petroleum) and supplying fuel oil to users who need the fuel oil anytime, and thus it is necessary to refill the fuel oil when the level of fuel oil in the fuel oil storage tank is low. In general, a tanker truck is driven to a location of a gas filling equipment of the fuel oil storage tank for the refill, and the tanker truck 100 has an oil pipe connector 80. During a refill operation, the oil pipe connector 80 is connected to an incoming oil pipe connector 104 of the fuel oil storage tank 103, a switch handle 86 of the oil pipe connector 80 is operated to allow the fuel oil in the tanker truck 100 to pass into the fuel oil storage tank 103 through the oil pipe connector 80 and the incoming oil pipe connector 103.

With reference to FIGS. 2 and 3 for a structure of a conventional oil pipe connector, the oil pipe connector 80 comprises a hollow connector cylinder 81 having an inlet 81A at a front end of the connector cylinder 81, an outlet 81B at a rear end of the connector cylinder 81, and a hollow circular conical shaped connector cap 82 installed in the connector cylinder 81, wherein the connector cap 82 is connected to a slightly rear end at the inlet 81A in the connector cylinder 81 by a fixing rib 83 at the periphery of the connector cap 82, and the connector cap 82 contains a control shaft 90, and the control shaft 90 includes a connecting portion 91 having a positioning shaft 92 passed through a shaft hole 820 of the front end of the connector cap 82, a piston disc 93 at the rear end of the connector cap 82, and a spring 94 installed between the control shaft 90 and the connector cap 82. A switch handle 86 is pivotally coupled to an outer side of the connector cylinder 81 by extending a link shaft 85 therein, and an end of the switch handle 86 is embedded and linked by a positioning pillar 87, and the link shaft 85 is pivotally coupled to a control rod 84, and the control rod 84 is connected at the connecting portion 91. The switch handle 86 is operated to drive the link shaft 85, the control rod 84 and the connecting portion 91, so that the piston disc 93 is displaced to open or close the outlet 81B.

Although the foregoing conventional oil pipe connector 80 can use the piston disc 93 to determine whether or not to pass the fuel oil through the outlet 81B to achieve the effect of controlling the refill. However, the use of the conventional oil pipe connector 80 still has the following drawbacks. In the conventional oil pipe connector 80, the fixing rib 83 of the periphery is used for positioning the connector cap 82, such that when the fuel oil is entered from the inlet 81A into the connector cylinder 81, the fuel oil is blocked by the fixing rib 83 to form a turbulence at the fuel oil refilling position at the inlet 81A and the oil pipe will become unsmooth, and the connector cap 82 is in a circular conical shape, such that the room of the pipeline for filling oil between the connector cap 82 and the connector cylinder 81 becomes narrower to restrict the volume of incoming oil, and thus the efficiency of filling oil cannot be improved effectively. Since the control rod 84 for driving the operation of the connecting portion 91 and the piston disc 93 comes with a design of a straight rod, therefore the displacement of the piston disc 93 is restricted, and when oil is filled, the piston disc 93 cannot have a large displacement to increase the space between the piston disc 93 and the outlet 81B in the pipeline for delivering oil, and thus the efficiency of delivering oil is poor. Overall speaking, the efficiency of using the conventional oil pipe connector extends the filling operation time and incurs a high cost, which is not cost-effective and relatively reduces the overall competitiveness. Therefore, it is an important subject for the related industry to find a way of overcoming the shortcomings of the conventional oil pipe connector.

In view of the foregoing shortcomings of the prior art, the inventor of the present invention conducted extensive researches and experiments, and finally developed a cost-effective oil pipe connector in accordance with the present invention to overcome the shortcomings of the prior art and promote the development of the related industry.

SUMMARY OF THE INVENTION

Therefore, it is a primary objective of the present invention to provide an oil pipe connector for maintaining a smooth flow of pipeline for an oil filling operation, and increasing the oil filling efficiency for a large volume of oil, and increasing the space for delivering the oil, so as to improve the oil delivery efficiency, and overcoming the shortcomings of the prior art to enhance the cost effectiveness of the oil filling operation.

To achieve the foregoing objectives, the present invention adopts a technical measure comprising: a connector cylinder, being a hollow housing, and having an oil inlet at a front end of the connector cylinder, an oil outlet at a rear end of the connector cylinder, and a switch base with a pivot hole interconnected with the interior of the connector cylinder; a control device, including a connector cap and a control mechanism, and the connector cap being a hollow conical shape, and a front end of the connector cap having positioning shaft hole interconnected with the interior, and the connector cap being positioned in the connector cylinder, and the control mechanism including a connecting portion, a positioning shaft and a piston disc coupled with each other, and a spring abutted between the control mechanism and the connector cap, and the positioning shaft being disposed in a positioning shaft hole of the connector cap; a switch device, including a push rod, a transmission shaft and a switch handle, and the push rod being a curved lever, and an end of the push rod linking the control mechanism, and the transmission shaft being pivotally coupled to the pivot hole of the switch base of the connector cylinder, and an end of the transmission shaft having a driving shaft portion integrally linked with the push rod, and another end of the transmission shaft having a connecting shaft portion protruded out from the pivot hole, and the switch handle being coupled to the connecting shaft portion.

To make it easier for our examiner to understand the technical characteristics and effect of the present invention, we use preferred embodiments with accompanying drawings for the detailed description of the invention as follows:

DETAILED DESCRIPTION OF THE PREFERRED EMBODIMENTS

Figure 1:
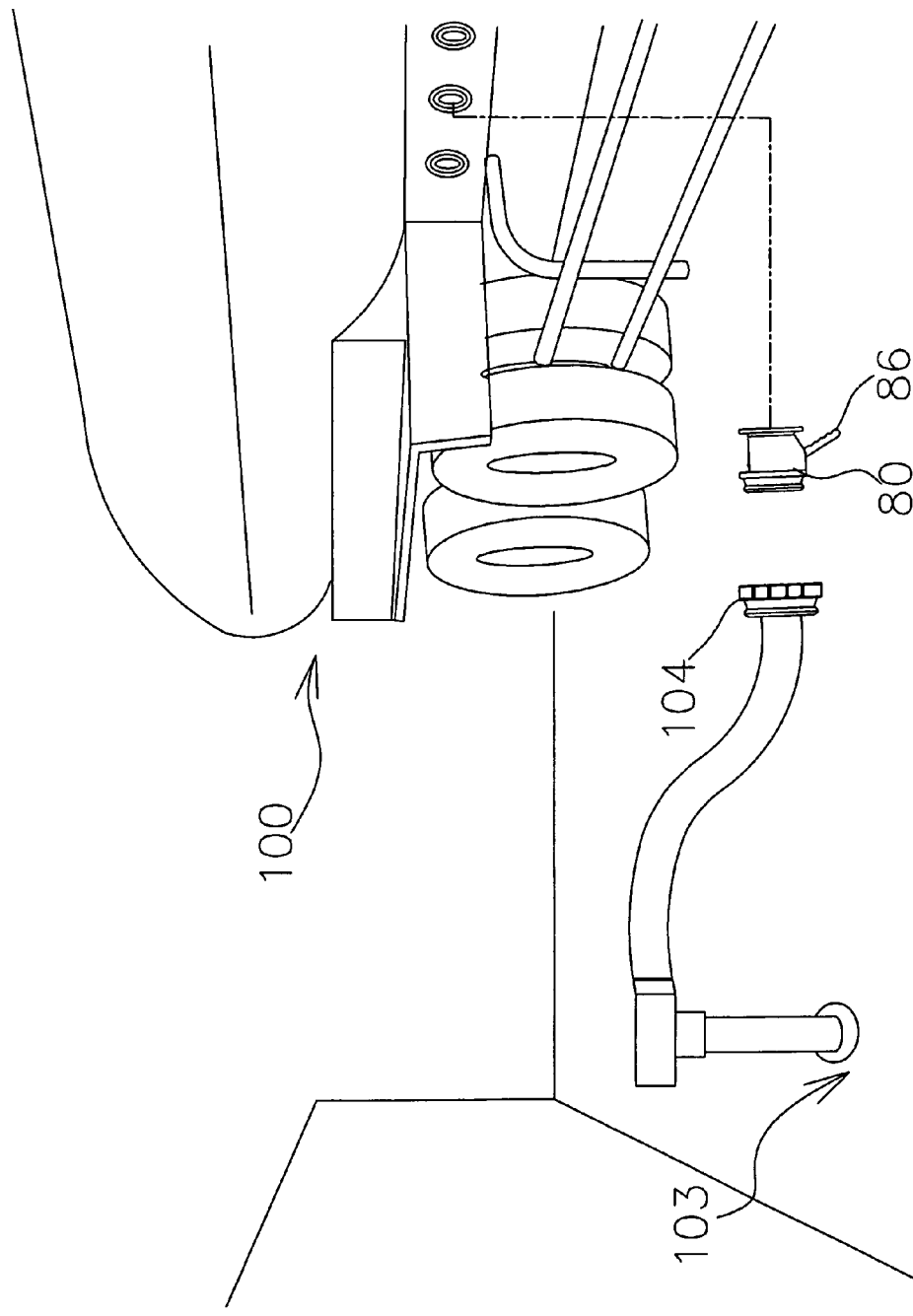
FIG. 1 is a schematic view of filling oil from a tanker truck in accordance with a prior art.
Figure 2:
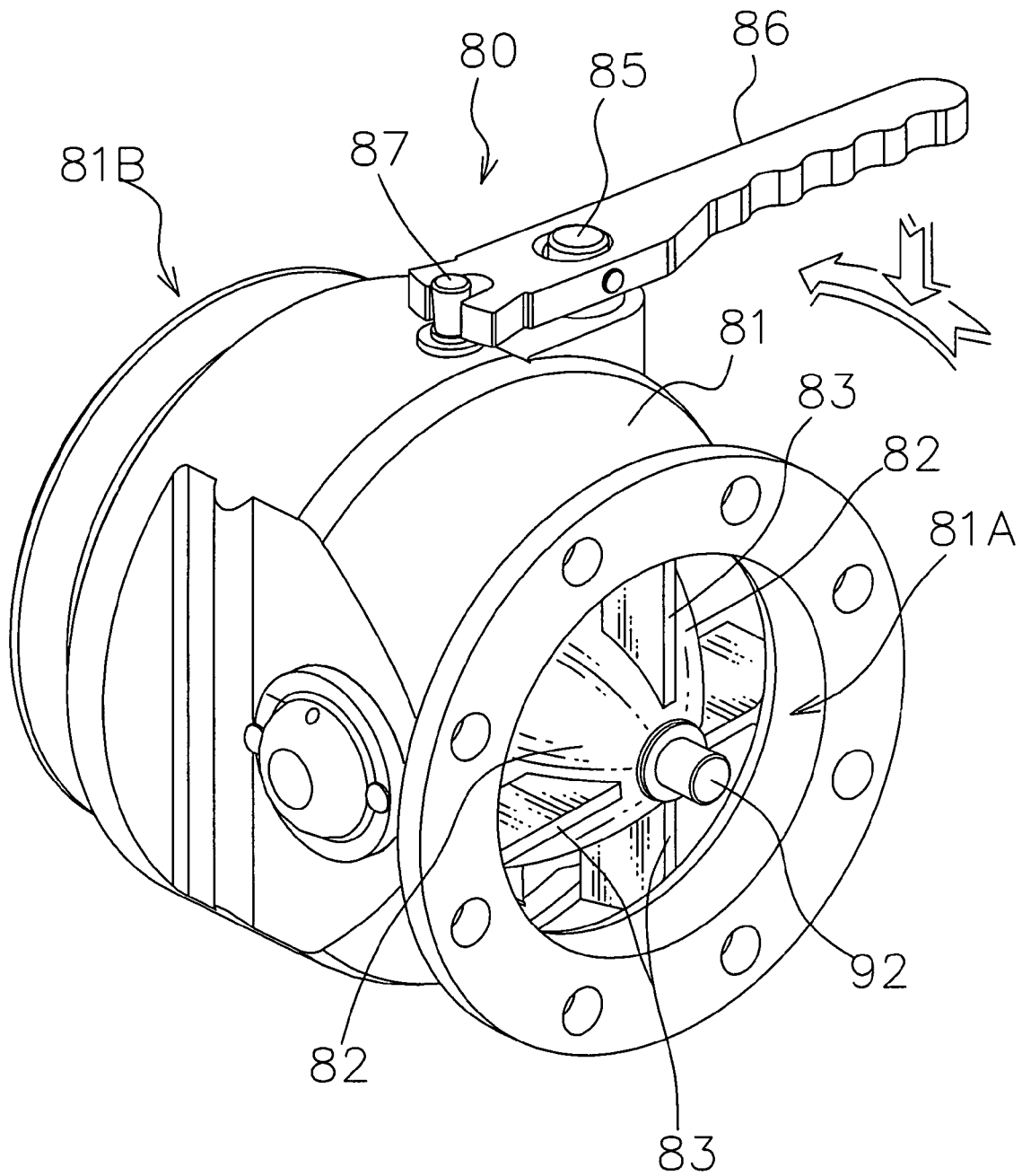
FIG. 2 is a schematic view of a conventional oil pipe connector.
Figure 3:
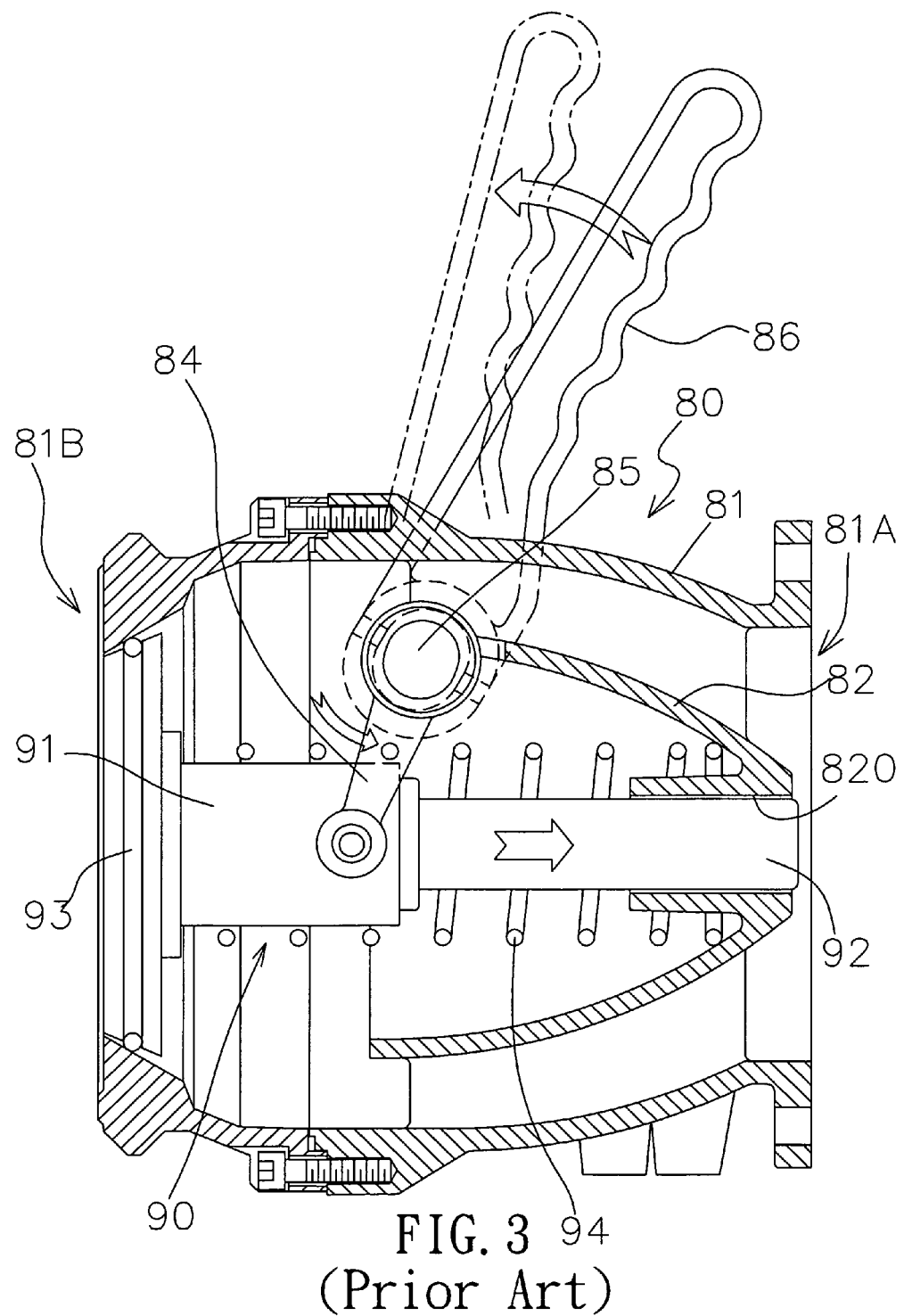
FIG. 3 is a cross-sectional view of a conventional oil pipe connector.
Figure 4:
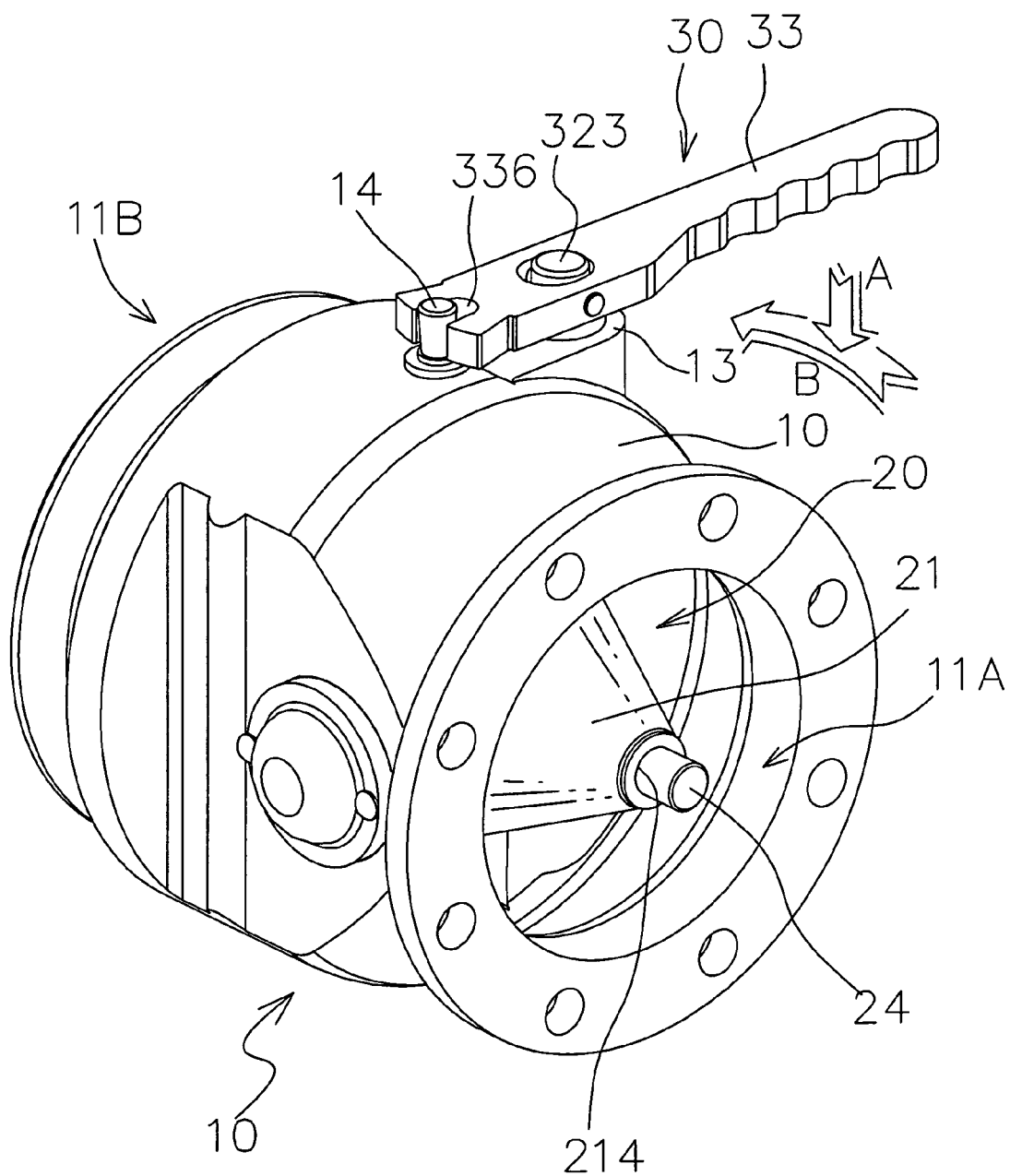
FIG. 4 is a perspective view of the present invention.
Figure 5:
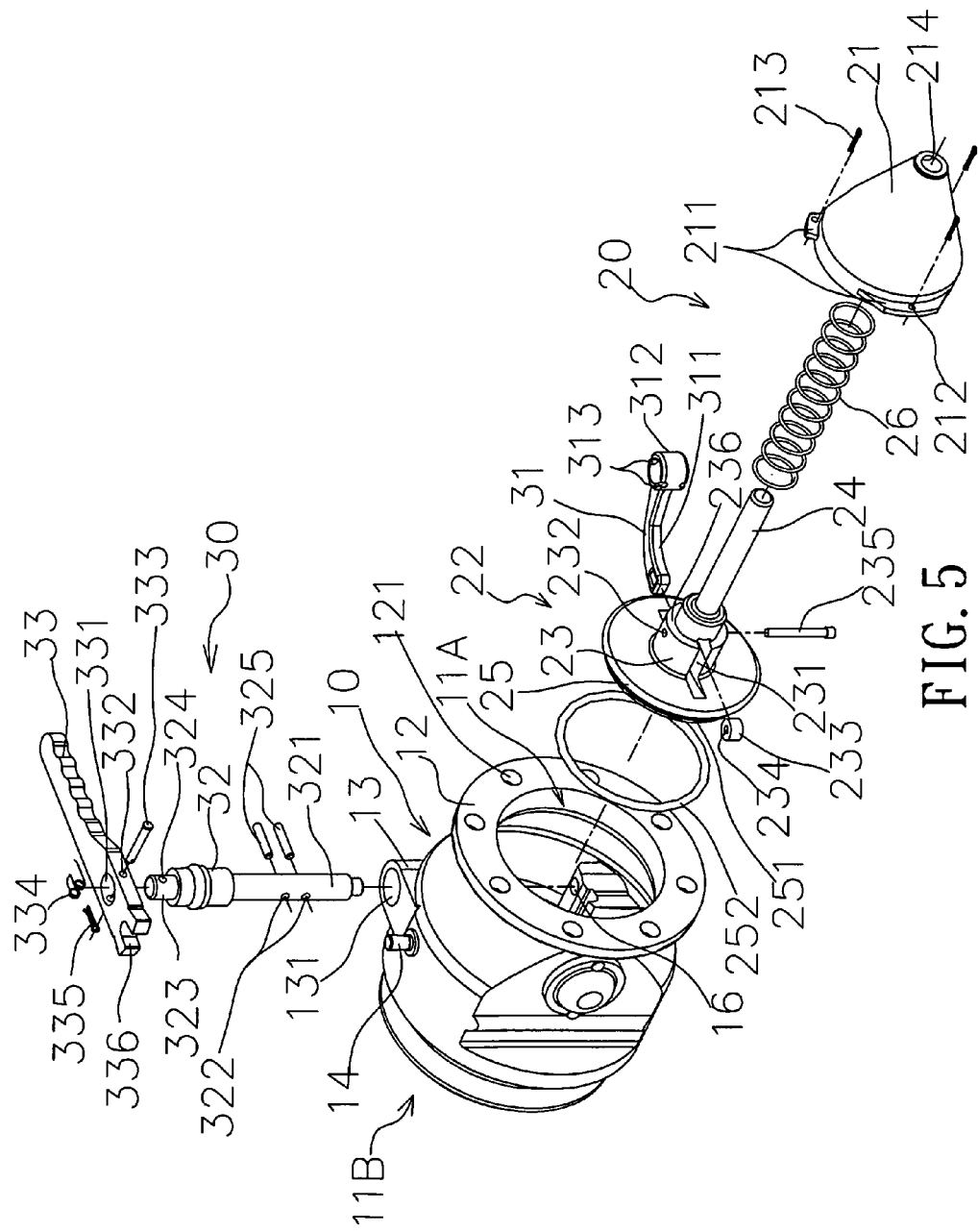
FIG. 5 is an exploded view of the present invention.
Figure 7:
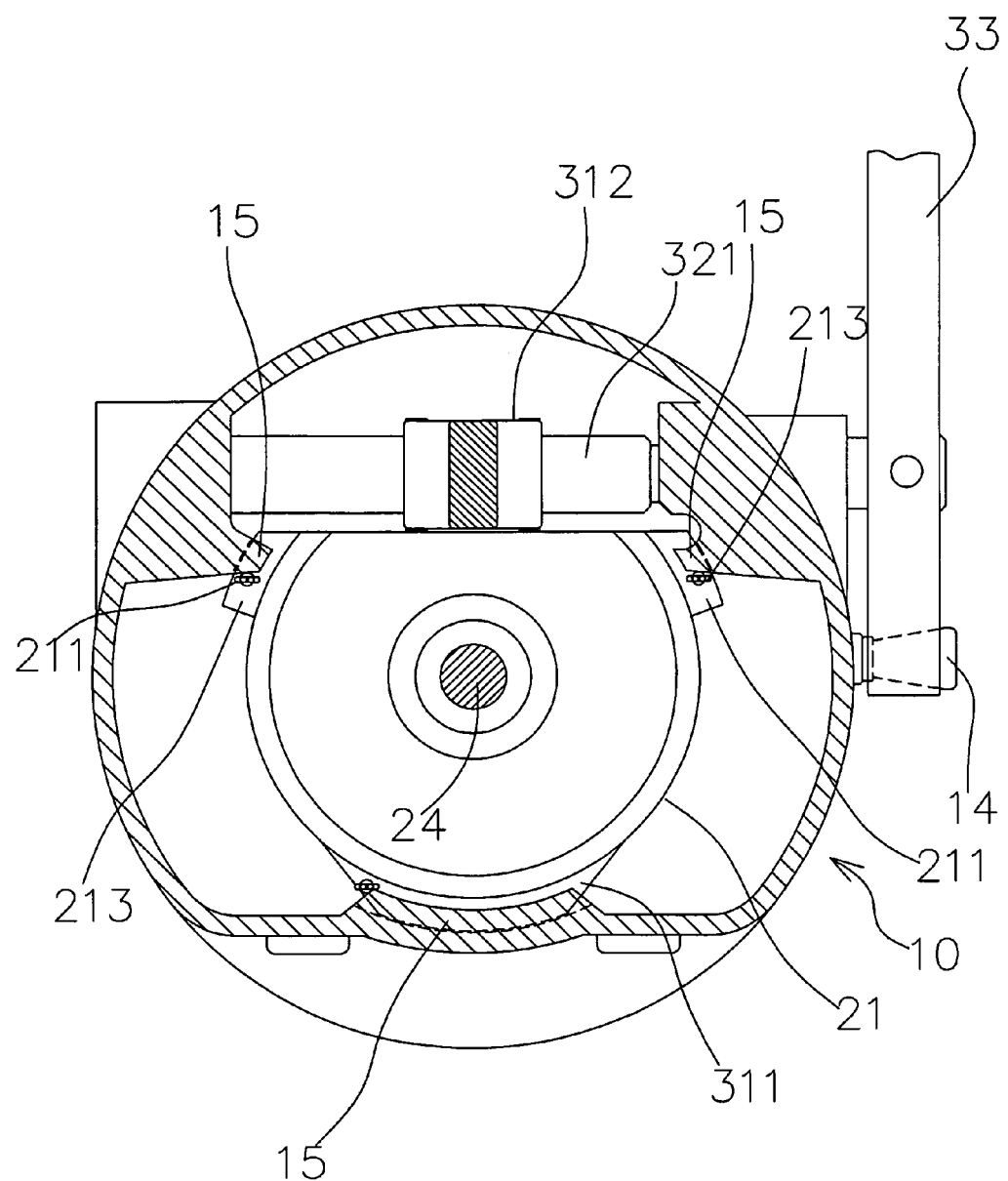
FIG. 7 is a front sectional view of the present invention.

With reference to FIGS. 4 and 5 for an oil pipe connector in accordance with the present invention, the oil pipe connector comprises a connector cylinder 10, a control device 20 and a switch device 30, wherein the connector cylinder 10 is a hollow housing having an oil inlet 11A at its front end and an oil outlet 11B at its rear end, and the front end of the connector cylinder 10 includes a pressing rim 12 having a plurality of positioning holes 121 for fixing with an oil pipe outlet of a tanker truck (not shown in the figures), and an outer side of the connector cylinder 10 includes a switch base 13 having a pivot hole 131 interconnected with the interior of the connector cylinder 10, and a positioning pillar 14 is protruded from a side of the connector cylinder 10 and at a position corresponding to the switch base 13, and the connector cylinder 10 includes a positioning shaft slot 16 disposed therein and corresponding to the switch base 13. In addition, the connector cylinder 10 includes a plurality of positioning slot portions 15 protruded from the middle area of the interior of the connector cylinder 10 (as shown in FIG. 7).

Figure 6:
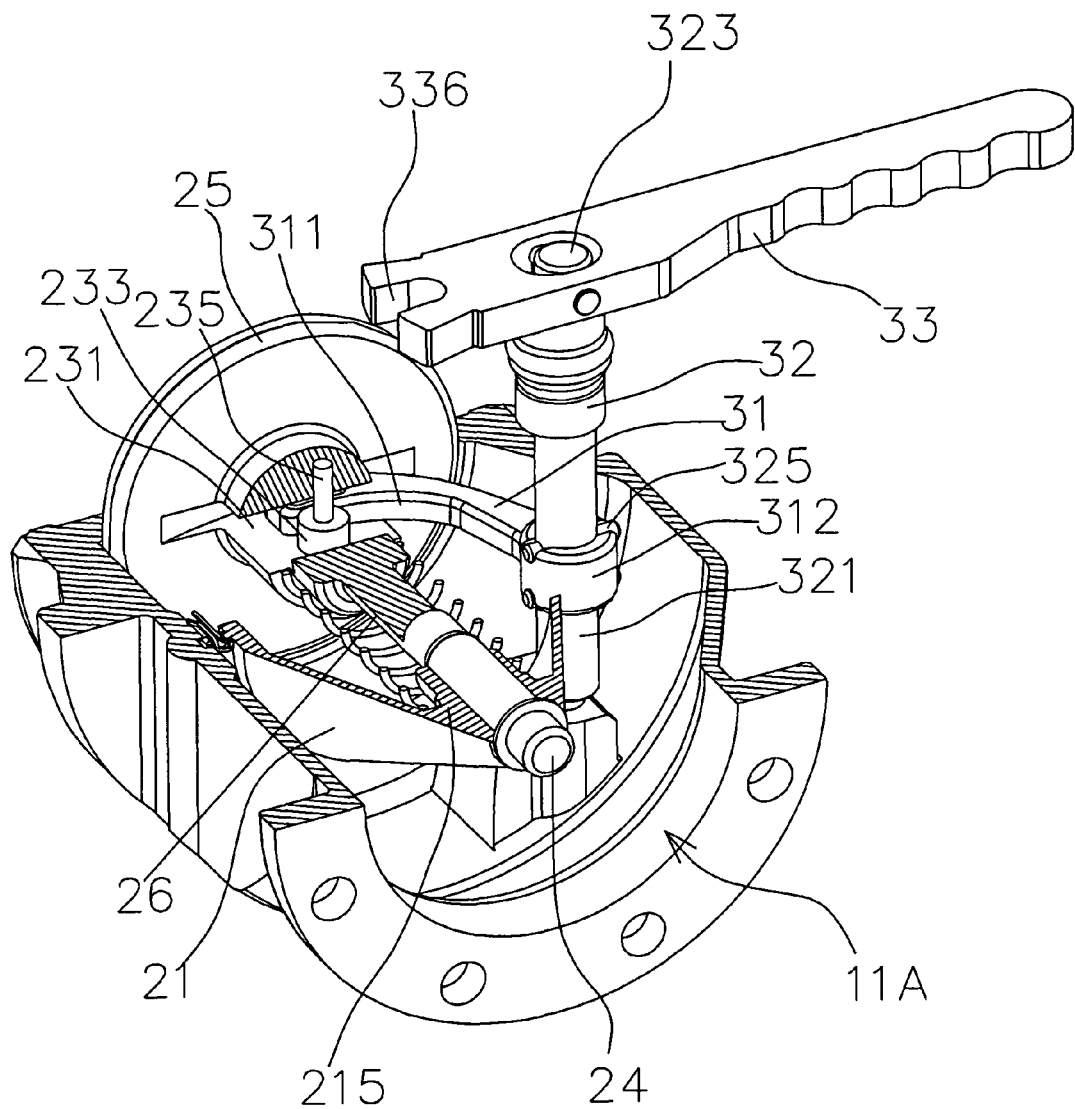
FIG. 6 is a perspective exploded view of the present invention.

The control device 20 comprises a connector cap 21 and a control mechanism 22, and the connector cap 21 is in a hollow conical shape, and the front end of the connector cap 21 is interconnected with a positioning shaft hole 214 therein, and the periphery of the rear end of the connector cap 21 has a plurality of outwardly extended fixing plates 211, and the fixing plate 211 has a pivot hole 212 and is embedded into a positioning slot portion 15 of the connector cylinder 10 and a pin 213 is passed through the pivot hole 212 of the fixing plate 211 for positioning the connector cap 21 in the connector cylinder 10. The interior of the connector cap 21 contains an inner press ring 215 disposed at the outer periphery of the positioning shaft hole 214 (as shown in FIG. 6). The control mechanism 22 includes a connecting portion 23, a positioning shaft 24 and a piston disc 25 coupled with each other, and the middle position of the connecting portion 23 includes a cut groove 231 penetrating through the connecting portion 23, and an external side of the connecting portion 23 includes a pivotal connecting hole 232 perpendicularly interconnected with the cut groove 231, and the cut groove 231 contains a rolling member 233, and the rolling member 233 is substantially a wheel having a pivot hole 234 at the central position of the wheel, such that a positioning pivot 235 is passed through the pivotal connecting hole 232 of the connecting portion 23 and the pivot hole 234 of the rolling member 233 for pivotally positioning the rolling member 233 in the cut groove 231. Further, the connecting portion 23 includes a ring pressing portion 236 disposed thereon, and the ring pressing portion 236 includes a spring 26, and an other end of the spring 26 is abutted against an inner press ring 215 of the connector cap 21 (as shown in FIG. 6) for providing a resilience for the control mechanism 22. The positioning shaft 24 is installed to a front end of the connecting portion 23, and extended into the positioning shaft hole 214 of the connector cap 21 for positioning the control mechanism 22 and restricting the operating direction. The piston disc 25 is installed at a rear end of the connecting portion 23, and an outer periphery of the piston disc 25 includes an embedding ring slot 251, and a leak-proof washer 252 is embedded into the embedding ring slot 251.

The switch device 30 includes a push rod 31, a transmission shaft 32 and a switch handle 33, and the push rod 31 is substantially in the shape of a curved lever and includes a curved slide surface 311, and an end of the push rod 31 is extended into the cut groove 231 of the connecting portion 23, and the curved slide surface 311 is provided for receiving the rolling member 233, and another end of the push rod 31 includes a shaft sleeve 312, and upper and lower circular surfaces of the shaft sleeve 312 include corresponding positioning slots 313. The transmission shaft 32 is inserted into and pivotally coupled to a pivot hole 131 at the switch base 13 of the connector cylinder 10, and an end of the transmission shaft 32 includes a longer driving shaft portion 321, and the driving shaft portion 321 includes two perpendicular insert holes 322, and the driving shaft portion 321 is passed through the shaft sleeve 312 of the push rod 31, and two pins 325 are passed through the positioning slot 313 of the push rod 31 and the insert hole 322 of the driving shaft portion 321 for fixing each other and integrally linking the driving shaft portion 321 and the push rod 31, and the front end of the driving shaft portion 321 is inserted and positioned into the positioning shaft slot 16 in the connector cylinder 10, and another end of the transmission shaft 32 includes a shorter connecting shaft portion 323 protruded out from the pivot hole 131, and the connecting shaft portion 323 includes a perpendicular insert hole 324. The switch handle 33 includes a connecting through hole 331 and a pin hole 332 perpendicularly interconnected with the connecting through hole 331, and the connecting through hole 331 is provided for passing the connecting shaft portion 323, and passing a pin 333 through the pin hole 332 and the insert hole 324, such that the switch handle 33 and the transmission shaft 32 are linked integrally. The other pin 333 in the connecting through hole 331 includes a torque spring 334, and the pin 333 at an outer side of the connecting through hole 331 includes a distal insert member 335 for positioning, and the switch handle 33 includes a concave clamping slot 336 disposed at a position corresponding to the positioning pillar 14 of the connector cylinder 10. While the concave clamping slot 336 is being clamped at the positioning pillar 14, the switch handle 33 is situated at an embedded and latched condition.

Figure 8:
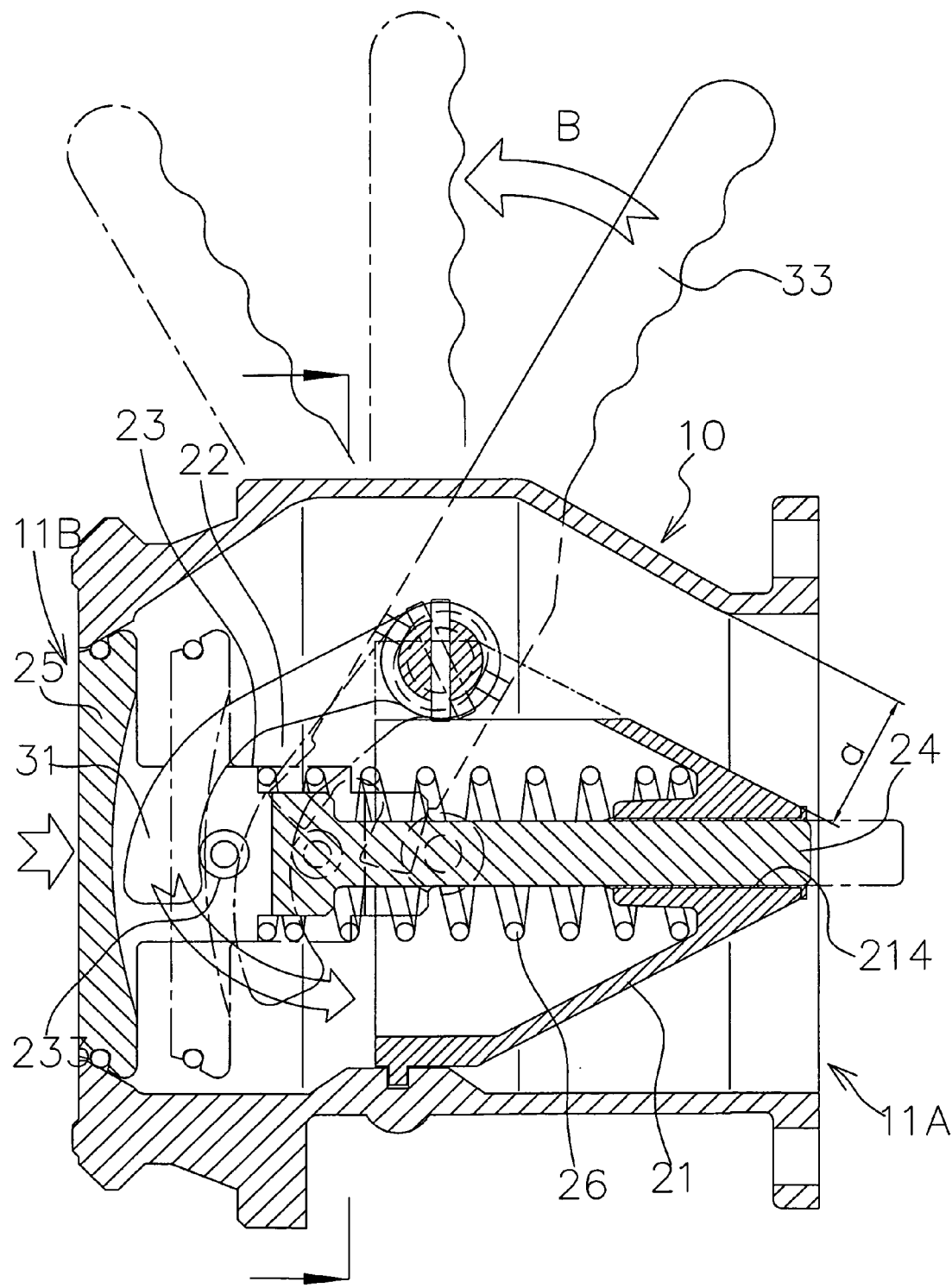
FIG. 8 is a schematic view of operating the present invention.

With reference to FIGS. 4 and 8 for an oil filling operation in accordance with the present invention, the connector cylinder 10 is connected to an incoming oil pipe inlet (not shown in the figure) of the fuel oil storage tank, and then the switch handle 33 is pressed down (in a direction A indicated by the arrow in the figures), and the switch handle 33 is pushed towards the rear end (in a direction B indicated by the arrow in the figures), such that the concave clamping slot 336 of switch handle 33 is clamped and propped up the latch of the positioning pillar 14, to embed in and fix the movement of the latch of the positioning pillar 14, and meanwhile switch handle 33 link the transmission shaft 32 and push the push rod 31 forward, and a curved slide surface 311 of the push rod 31 is used for rolling the rolling member 233 thereon (as shown in FIGS. 6 and 8), and the control mechanism 22 is displaced and moved forward. Now, the piston disc 25 is also displaced to release from the latch of the oil outlet 11B, and the fuel oil entered from the oil inlet 11A into the connector cylinder 10 can be entered from the oil outlet 11B into the fuel oil storage tank through the incoming oil pipe to complete the oil filling operation. If it is necessary to stop the oil filling operation, release the concave clamping slot 336 of the switch handle 33 from the latch of the positioning pillar 14, such that the control mechanism 22 moves backward according to the resilience of the spring 26. If the switch handle 33 is pushed to a latched position and pressed slightly downward, the concave clamping slot 336 will be positioned across the positioning pillar 14 to recover the latched condition. Now, the piston disc 25 shuts the oil outlet 11B again, so that the fuel oil cannot flow out from the oil outlet 11B to stop the oil filling operation.

In the oil pipe connector of the invention, the push rod 31 is a curved lever, and the curved slide surface 311 is used for pushing the rolling member 233 and the control mechanism 22, so that the displacement of the control mechanism 22 will be increased greatly, and the piston disc 25 will be withdrawn with a larger distance for increasing the space between the piston disc 25 and the oil outlet 11B, so as to improve the oil delivery volume and the oil delivery efficiency. Since the connector cap 21 is in a conical shape, the space of an oil passage between the connector cap 21 and the connector cylinder 10 can be increased, and the connector cap 21 is fixed onto the connector cylinder 10 by the fixing plate 211 at the rear end of the connector cap 21 (so that the fixing rib at the front end of the connector cap in accordance with the prior art) can be omitted. During the oil filling operation, the fuel oil can be entered into the connector cylinder 10 through an external side of the connector cap 21 smoothly without blocking, impact or turbulence at the inlet, so as to improve the oil filling volume and efficiency. Obviously, the oil pipe connector of the invention can overcome the shortcoming of the prior art and enhancing the cost-effectiveness of the oil filling operation.

While the invention has been described by means of specific embodiments, numerous modifications and variations could be made thereto by those skilled in the art without departing from the scope and spirit of the invention set forth in the claims.

What is claimed is:

1. An oil pipe connector, comprising:
   a connector cylinder, being a hollow housing, and having an oil inlet at a front end of said connector cylinder, an oil outlet at a rear end of said connector cylinder, and a switch base with a pivot hole interconnected with the interior of said connector cylinder;
   wherein said connector cylinder includes a plurality of positioning slot portions protruded from the middle position of said connector cylinder, and a plurality of fixing plates embedded into said positioning slot portion are protruded outward from the periphery of the rear end of a connector cap, and said fixing plate includes a pivot hole, and a pin is passed through said pivot hole of said fixing plate for positioning said connector cap in said connector cylinder;
   a control device, including said connector cap and a control mechanism, and said connector cap being a hollow conical shape, and a front end of said connector cap having a positioning shaft hole interconnected with the interior, and said connector cap being positioned in said connector cylinder, and said control mechanism including a connecting portion, a positioning shaft and a piston disc coupled with each other, and a spring abutted between said control mechanism and said connector cap, and said positioning shaft being disposed in said positioning shaft hole of said connector cap;
   a switch device, including a push rod, a transmission shaft and a switch handle, and said push rod being a curved lever, and an end of said push rod linking said control mechanism, and said transmission shaft being pivotally coupled to said pivot hole of said switch base of said connector cylinder, and an end of said transmission shaft having a driving shaft portion integrally linked with said push rod, and another end of said transmission shaft having a connecting shaft portion protruded out from said pivot hole, and said switch handle being coupled to said connecting shaft portion.

2. An oil pipe connector, comprising:
   a connector cylinder, being a hollow housing, and having an oil inlet at a front end of said connector cylinder, an oil outlet at a rear end of said connector cylinder, and a pressing rim disposed at said front end of said connector cylinder, and said pressing rim includes a plurality of positioning holes for fixing an oil pipe outlet of a tanker truck, and a switch base with a pivot hole interconnected with the interior of said connector cylinder, and a plurality of positioning slot portions protruded from the middle position of said connector cylinder, and a plurality of fixing plates embedded into said positioning slot portion are protruded outward from the periphery of the rear end of a connector cap, and said fixing plate includes a pivot hole, and a pin is passed through said pivot hole of said fixing plate for positioning said connector cap in said connector cylinder;
   a control device, including said connector cap and a control mechanism, and said connector cap being a hollow conical shape, and a front end of said connector cap having a positioning shaft hole interconnected with the interior, and said connector cap being positioned in said connector cylinder, and said control mechanism including a connecting portion, a positioning shaft and a piston disc coupled with each other, and a spring abutted between said control mechanism and said connector cap, and said positioning shaft being disposed in said positioning shaft hole of said connector cap;
   a switch device, including a push rod, a transmission shaft and a switch handle, and said push rod being a curved lever, and an end of said push rod linking said control mechanism, and said transmission shaft being pivotally coupled to said pivot hole of said switch base of said connector cylinder, and an end of said transmission shaft having a driving shaft portion integrally linked with said push rod, and another end of said transmission shaft having a connecting shaft portion protruded out from said pivot hole, and said switch handle being coupled to said connecting shaft portion, and said connector cylinder includes a positioning pillar protruded from a side corresponding to said switch base, and said switch handle includes a concave clamping slot disposed at a position corresponding to an end of said positioning pillar, and said connector cylinder includes a positioning shaft slot disposed therein and at a position corresponding to said switch base for positioning said driving shaft portion.

3. The oil pipe connector according to claim 1, wherein said connector cap includes an inner press ring disposed therein and at an external periphery of said positioning shaft hole, and said connecting portion includes a ring pressing portion, and said spring is used for abutting between said ring pressing portion and said inner press ring.

4. The oil pipe connector according to claim 1, wherein said positioning shaft is disposed at a front end of said connecting portion, and said piston disc is disposed at a rear end of said connecting portion, and said piston disc includes an embedding ring slot disposed at an external periphery of said piston disc, and said embedding ring slot includes a leak-proof washer embedded into said embedding ring slot.

5. The oil pipe connector according to claim 1, wherein said connecting shaft portion includes a perpendicular insert hole, and said switch handle includes a connecting through hole and pin hole perpendicularly interconnected with said connecting through hole, and a pin is passed through said pin hole and said insert hole for internally linking said switch handle and said transmission shaft.

6. The oil pipe connector according to claim 5, wherein said pin in said connecting through hole includes a torque spring, and said pin at an outer side of said connecting through hole includes a distal insert member for positioning.

7. The oil pipe connector according to claim 1, wherein said connecting portion includes a cut groove penetrating through said connecting portion, and an external side of said connecting portion includes a pivotal connecting hole perpendicularly interconnected with said cut groove, and said cut groove contains a rolling member therein, and the middle of said rolling member includes a pivot hole, and a positioning pivot is passed through said pivotal connecting hole of said connecting portion and said pivot hole of said rolling member.

8. The oil pipe connector according to claim 7, wherein said push rod includes a curved slide surface for receiving said rolling member, and an end of said push rod is extended into said cut groove of said connecting portion, and another end of said push rod includes a shaft sleeve for passing said driving shaft portion.

9. The oil pipe connector according to claim 8, wherein said shaft sleeve has a positioning slot disposed separately on upper and lower circular surfaces of said shaft sleeve, and said driving shaft portion includes a perpendicular insert hole, and said driving shaft portion is passed through said shaft sleeve of said push rod, and a pin is passed through said positioning slot of said push rod and said insert hole of said driving shaft portion.

* * * * *